T. B. DIXON.
TELEGRAPHY.
APPLICATION FILED MAR. 20, 1918.
1,339,551.
Patented May 11, 1920.
2 SHEETS—SHEET 1.
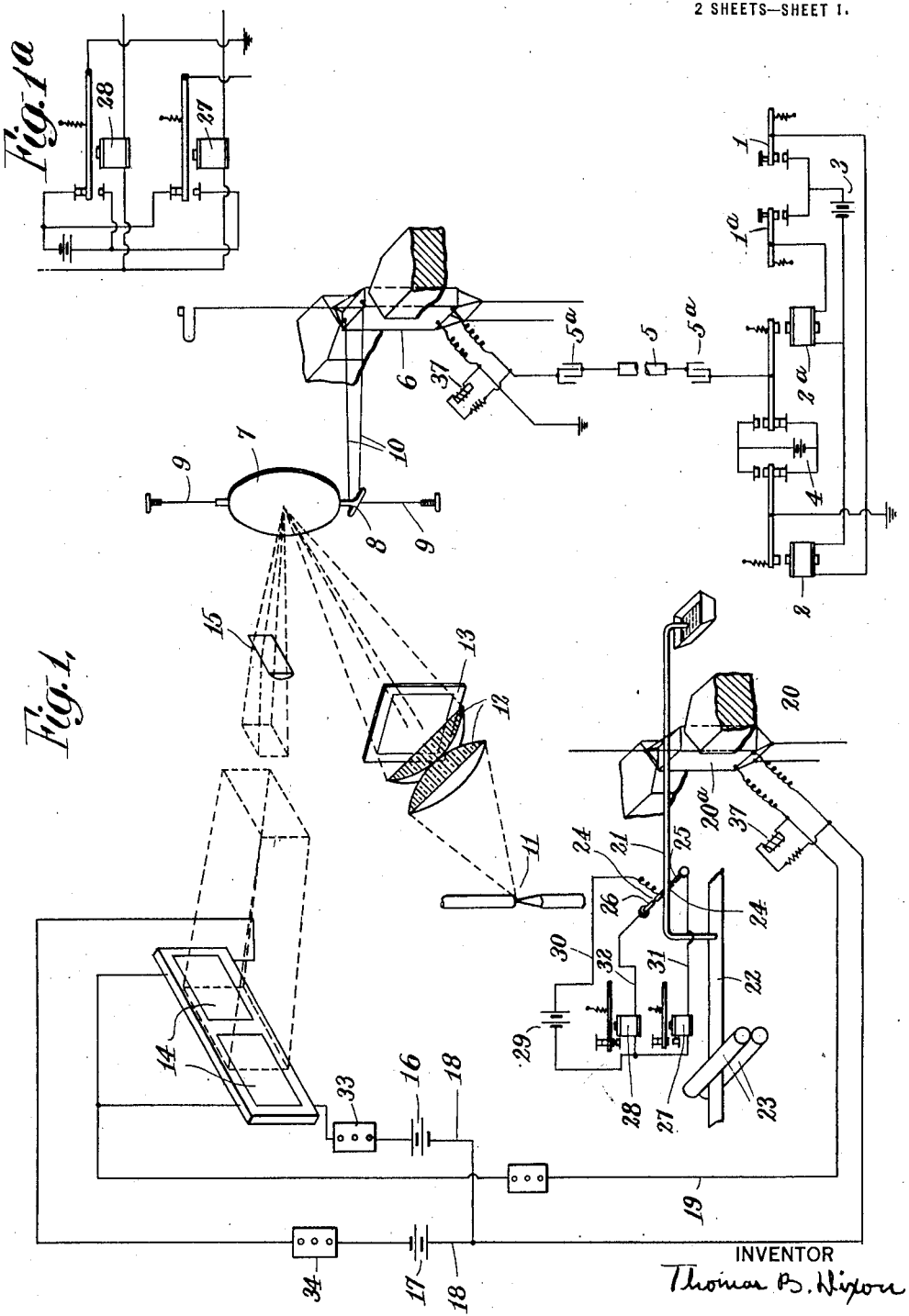
INVENTOR
Thomas B. Dixon

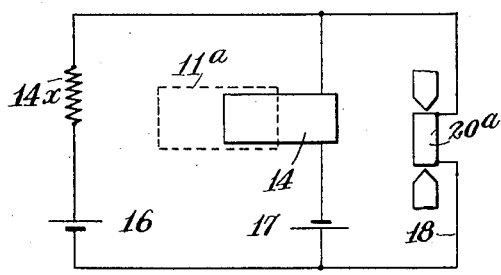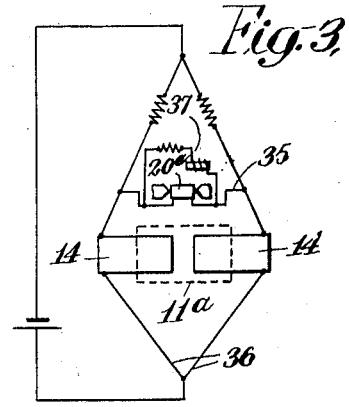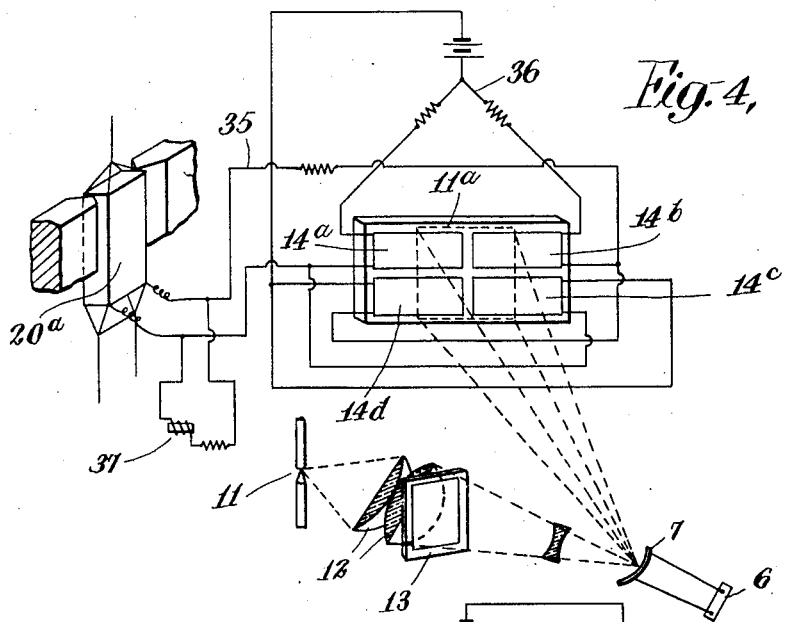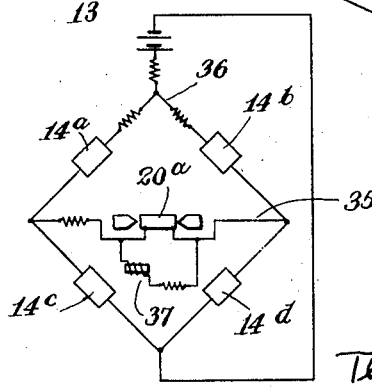

UNITED STATES PATENT OFFICE.

THOMAS BULLITT DIXON, OF NEW YORK, N. Y.

TELEGRAPHY.

1,339,551.     Specification of Letters Patent.     Patented May 11, 1920.

Original application filed December 5, 1913. Serial No. 804,873. Divided and this application filed March 20, 1918. Serial No. 223,529.

*To all whom it may concern:*

Be it known that I, THOMAS BULLITT DIXON, a citizen of the United States of America, and a resident of New York city, county and State of New York, have invented new and useful Improvements in Telegraphy, of which the following is a specification.

My invention relates to telegraph systems and apparatus, and particularly to systems and apparatus adapted for use in connection with lines of very great retardation, such as submarine cables. In the method of transmitting and receiving telegraphic signals, most commonly used on long submarine cable lines, dots and dashes of the telegraphic code are represented by current pulses of different directions, but of approximately the same duration, a positive pulse for example, indicating a dot, and a negative pulse, a dash. The signals are received by an instrument, termed a "siphon recorder" which is in its nature a very sensitive galvanometer the moving member of which is provided with a pen (this pen being, in practice, a siphon tube) which traces a wavy line on a moving record strip, waves to one side of an imaginary center on such strip designating dots and waves to the other side of such imaginary center designating dashes. At low speed, the signals thus transmitted and received come out clearly; but as the speed of transmission rises, the signals become indistinct, until, at what would be a very moderate speed for transmission over a land line, the signals become so indistinct as to be unintelligible.

My present application is a division of my co-pending application Serial No. 804,873, filed December 5, 1913, for "improvements in telegraphy," and my invention comprises a method of, and means for, amplifying telegraphic signals, particularly signals transmitted as described through circuits of very great retardation, whereby distinct signals are produced at speeds of transmission at which signals, if received in the ordinary way, would be unintelligible; and by the method of and means for amplifying signals, herein described, I have been able to reach a speed of transmission very much greater than any practicable speed of transmission heretofore possible over the same or corresponding lines.

As above stated, the receiving instrument commonly used is in its nature a galvanometer. The currents which operate this galvanometer are so exceedingly feeble that I have not found it practicable, in practice, to amplify such signals materially by mechanical means; for mechanical means for amplification of signals necessarily involves moving parts which have inertia, the effect of inertia being to so dampen the signals as to defeat the desired object. According to my present invention, I substitute a reflector, or other means for directing and deflecting a beam of radiant energy (usually a light beam), for the pen or siphon tube of the recorder, and cause this beam of radiant energy to act variably on radio-electro-sensitive means (customarily one or more selenium cells). The light beam deflected by the mirror of the galvanometer constitutes in effect a pointer of any desired length, but which is entirely without inertia. Therefore the length of the light beam may be varied as desired or required, thereby effecting movement of the pointer through any desired range, without increasing the inertia of the movable galvanometer member.

As is well known, selenium is a substance the electrical resistance of which varies greatly accordingly as it be in light or in darkness. In darkness selenium has very high electric resistance, but when brightly illuminated the resistance of the selenium falls very greatly. Other substances have similar properties. Actinium for example has a relatively low resistance in darkness and a relatively high resistance when brightly illuminated. And my radio-electro-sensitive element is not necessarily either a selenium cell or an actinium cell; for a thermal couple such as is commonly contained in a thermopile will generate current variably if acted upon variably by heat rays. I prefer, however, to use selenium cells as the radio-electro-sensitive elements employed according to my invention, as in practice I have found them very reliable, and I so locate one or more of these cells that the beam of light, variably deflected by the galvanometer reflector, as previously described, will move across the face or faces of such cell or cells. I connect such cell or cells to an electric circuit or circuits containing a source or sources of electric energy, for example, a primary battery, and the variation of resistance of the selenium cell or cells, due to the variable illumination of such cell or cells, causes variation in current flow through such circuit or circuits, capable of actuating the moving element of a galvanometer or like instrument. The receiving instrument employed by me in the circuit of such selenium cell or cells is commonly an ordinary siphon recorder; the amplification of the signals of the cable circuit, due to the variable deflection of a beam of light by a reflector, actuated by such signals, over the surface or surfaces of a selenium cell or cells themselves in the circuit of the siphon recorder, being so great that intelligible and very clear signals are produced at speeds far above the speeds at which intelligible signals would be produced if the siphon recorder were in the cable circuit itself, according to former practice. I have not found that, by so amplifying the signals of the cable, objectionable peculiarities are impressed upon such signals by the amplifying apparatus. To the contrary, the signals remain of the same character as before, except that their quality is improved, but the deflections of the movable member of the siphon recorder are so very much greater than they would be if that siphon recorder were directly in the cable circuit, that intelligible and very clear signals are produced at speeds of transmission far above what has been practicable heretofore on similar circuits.

My invention consists, therefore, in a method of amplifying telegraphic signals transmitted through circuits of great retardation, such method comprising causing the current wave in such circuit to vary the action of radiant energy on radio-electro-sensitive means, and causing such radio-electro-sensitive means to produce variations in current flow in a circuit comprising signal-receiving means. My invention comprises, as an apparatus, signal-amplifying means comprising radiant-energy-varying means adapted to be influenced by the current waves of the transmission circuit and adapted to vary the action of radiant energy on radio-electro-sensitive means, together with signal receiving means in a circuit influenced by such radio-electro-sensitive means.

The object of my invention is to increase the speed and certainty of transmission of signals through electric circuits, particularly circuits of high retardation.

The accompanying drawings illustrate diagrammatically the method of and means for amplification of telegraph signals, herein described. In said drawings:

Figure 1 shows diagrammatically an arrangement of transmitting, signal-amplifying, signal-receiving and signal-repeating means embodying the apparatus portion of my invention, and adapted for carrying out the process portion of my invention.

Fig. 1$^a$ is a detail diagram showing the transmitting circuits of repeating relays 27 and 28 of Fig. 1.

Fig. 2 is a diagram illustrating the use of one radio-electro-sensitive element in lieu of the two radio-electro-sensitive elements employed in Fig. 1 and further illustrates the fact that in the arrangement shown in Fig. 1 each radio-electro-sensitive element 14 acts, in a measure, independent of the other.

Fig. 3 shows an alternative arrangement of circuits for use when a plurality of radio-electro-sensitive elements are employed, such elements being located in a Wheatstone bridge.

Fig. 4 is a diagram somewhat similar to Fig. 3, but indicating connections which may be employed when four radio-electro-sensitive elements are employed in a Wheatstone bridge circuit; Fig. 4 also illustrating the light beam and means for producing it, the line galvanometer and the coil and magnets of the receiving siphon recorder.

Fig. 5 is a diagram illustrating, in conventional Wheatstone bridge arrangement, the location of the several radio-electro-sensitive elements in the sides of the Wheatstone bridge of Fig. 4.

Referring first to Fig. 1 numerals 1 and 1$^a$ designate two telegraphic keys (shown in this case, as keys designed to be operated by hand) which operate corresponding transmitting relays 2, 2$^a$ by closing and breaking branch circuits of battery 3. The key 1, when depressed, will close circuit from this battery to the relay 2, and the key 1$^a$, when depressed, will close circuit to the relay 2$^a$. The operation of either of these relays places a transmitting battery 4 in circuit to send current into the cable 5, which cable, as shown, connected for working in one direction, is provided with the usual block condensers 5$^a$ at its two ends. The currents sent into the cable will have a polarity of positive to line and negative to earth when the relay 2$^a$ is operated, and a polarity of positive to earth and negative to line when the left hand relay 2 is operated. At the receiving end of the cable there is a galvanometer comprising a suspended coil 6, located in a magnetic field, and in a circuit extending from the cable, through the corresponding condenser 5ª, to ground. The receiving galvanometer further comprises a mirror 7 suspended by suspension fibers 9 to swing freely, and provided at its lower end with a T-shaped piece 8 connected to coil 6 by two delicate fibers 10; the points of connection of these fibers 10 to the piece 8 being, preferably, closer together than the points of connection of said fibers to the coil 6, so that for any given angular movement of the coil 6, the angular movement of the mirror 7 is greater. A suitable source of light 11, is provided (the particular source diagrammatically indicated being the carbons of an electric arc lamp) and the light beam from such source passes through suitable lenses 12 and a screen 13 to the reflector 7, and thence is reflected variably to selenium cells hereinafter mentioned. The beam of light from the source 11 is shaped by condensing lenses 12 and the screen 13 so that its cross section, at the point where it strikes the selenium cells 14, would be approximately square but for the fact that it passes through a plano-cylindrical lens 15 which condenses it in one direction (*i. e.*, condenses it vertically with the lens 15 positioned as shown in the drawing). The beam of light is therefore approximately rectangular where it strikes upon the selenium cells. The selenium cells 14 have their terminals connected with batteries 16 and 17 in circuit branches 18 of a circuit 19 connected to the coil 20ª of a siphon recorder 20; which recorder is itself a specific form of galvanometer. When the light beam is in central position with respect to the two selenium cells, as indicated in the drawing, then, assuming the batteries 16 and 17 to be equal, and the resistances in the circuit branches 18 (such resistances including the resistances of the selenium cells themselves) to be equal when the two cells 14 are equally illuminated, then the two batteries 16 and 17 oppose each other in the circuit 19 and no current will flow through the coil 20ª of the siphon recorder. When, however, the light beam is deflected from its central or zero position, indicated, to one side or the other (for example, when the light beam is deflected from left to right, such deflection corresponding it may be assumed, to a dot signal transmitted through the cable 5) current from battery 17 will predominate and flow through circuit 19 and coil 20ª of the siphon recorder, thus causing movement of the siphon tube or pen 21. If the deflection of the light beam is from right to left (such deflection corresponding to a "dash" signal) the current of battery 16 will predominate. I have indicated that, as is usual in siphon recorders, the siphon tube trails over a strip of moving tape 22, moved forward continuously by suitable feeding means 23. The siphon tube therefore traces a line along the tape 22 as the latter moves, which line is deflected to one side or the other when the coil 20ª of the recorder is deflected to one side or the other.

My signal amplifying device may also be used as a repeater; to this end the coil 20ª may operate a contact point 24 (shown in the drawing as mounted on the siphon tube 21 itself) which contact point 24 plays between contact stops 25 and 26 in circuit, respectively, with repeating relays 27 and 28 in circuit of a battery 29, one side of this battery being connected by a conductor 30 to contact point 24, and the other side of this battery being connected, by conductor 31, and through repeating relay 27, to contact stop 25, and being also connected by a conductor 32, through repeating relay 28, to contact stop 26.

When the coil 6 of the receiving galvanometer is in central position, and, therefore, when the light beam playing upon the selenium cells is in zero position, one half of each of the selenium cells 14 is illuminated, the other half of each such cell being unilluminated. The resistance of the two selenium cells should then be equal; but since it is difficult to obtain two selenium cells of exactly the same resistance, I have indicated in the drawing adjusting rheostats 33 and 34, whereby the resistance of the two circuit branches 18 may be made equal.

The operation of the system is as follows:

Supposing the transmitting key 1 to be depressed, then the negative pole of battery 4 is connected to the cable through the contacts of the relay 2ª, and the positive pole of battery 4 is connected to ground through the contacts of the relay 2; and a current wave is transmitted through the cable 5, causing deflection of coil 6 of the receiving galvanometer (and it may be assumed that such deflection is to the right), which in turn causes the beam of light playing on the selenium cells 14 to move to the right, decreasing the illumination of the left hand cell 14 and increasing the illumination of the right hand cell 14, and so increasing the resistance in the circuit branch 18 containing battery 16, and decreasing the resistance in the circuit branch 18 containing battery 17, thereby disturbing the balance theretofore existing between these two branch circuits and causing flow of current through circuit 19 which, in turn, causes deflection of coil 20ª, moving the tracing end of siphon tube 21 (and it may be assumed that such motion is to the right). Similarly, depression of key 1ª will cause movement of the siphon tube 21 to the left.

While the two selenium cells 14, in the arrangement just described, coöperate to produce, by their varying resistance, deflections of coil 20ª, they also operate independently in a sense; as is indicated by Fig. 2, wherein only one of these cells 14 is shown, the other cell 14 being replaced by a fixed resistance 14ˣ; circuit arrangements being otherwise similar, the beam of light being indicated by a dotted rectangle 11ª. It will be seen that while, with the beam of light in the position shown, and the resistance 14ˣ adjusted to exactly balance the resistance of the selenium 14 so illuminated, the batteries 16 and 17 neutralize each other respectively in the circuit 18, yet if that beam of light be moved, the consequently varied resistance of cell 14 will cause a current from the one battery or the other to pass through circuit 18 and deflect the coil 20ª.

Various arrangements of circuits including the selenium cells and the coil 20ª may be used. In Fig. 3 I indicate a Wheatstone bridge arrangement wherein the two selenium cells 14 are each in one side of the bridge, the coil 20ª being in the cross wire 35 of the bridge, the latter being designated generally by the number 36.

Instead of employing one cell only, or two cells only, a larger number of selenium cells may be employed. In Fig. 4 I show one means for employing four selenium cells designated respectively by reference characters 14ª, 14ᵇ, 14ᶜ and 14ᵈ. The circuits are those of a Wheatstone bridge 36, as will be more apparent from Fig. 5, wherein the circuits are shown in conventional Wheatstone bridge arrangement, without regard to the relative physical positions of the various selenium cells; the coil 20ª being in the cross wire 35 of the bridge. The principle of the Wheatstone bridge being well known, it will be apparent that if movement of the beam of light 11ª increases the illumination of selenium cells 14ª and 14ᵈ and decreases the illumination of cells 14ᵇ and 14ᶜ, there will be a flow of current in one direction through the cross wire 35 of the bridge, producing a deflection of coil 20ª; while if the change in illumination of the selenium cells be in the opposite sense, there will be a flow of current through the cross wire 35 in the opposite direction.

I have found that the sharpness of definition of the signals, and the permissible speed of transmission, are greatly increased by the provision, in connection with the coil 6 of the receiving galvanometer, and also in connection with the coil 20ª of the siphon recorder, of a "magnetic shunt" 37, (see Fig. 1), *i. e.*, a resistance of high inductive value such as is commonly used in connection with siphon recorders in cable systems; such shunted inductive resistances having, as is well known, the effect of "squaring" the signals.

I use the term "illumine" and like terms, with reference to the action of radiant energy (a light beam, for example) on radio-electro-sensitive means (selenium cells, for example) as inclusive of action of radiant energy of all classes on radio-electro-sensitive means of all types.

By the method of and means for amplifying cable signals herein illustrated and described, I have been able to attain a speed of transmission of three hundred and seventy letters per minute over a cable about eight hundred miles in length and having an ohmic resistance of eight thousand ohms and a static capacity of two hundred and sixty micro-farads, *i. e.*, a K R factor of 2,080,000, the signals, as recorded on the tape of a siphon recorder being substantially perfect in form and entirely readable. Still higher speed of transmission has been obtained by me over this cable when, owing to temporary conditions, the retardation was lower than as given above.

What I claim is:

1. The herein described method of transmitting, receiving and amplifying telegraphic signals, which comprises transmitting signals through an electric circuit by currents of one polarity for one class of signals of the telegraphic code, and by currents of the opposite polarity for another class of signals of the telegraphic code, causing the signals so transmitted to vary the degree of illumination of a radio-electro-sensitive element in an electric circuit, which element is illuminated to an intermediate and substantial degree when no signals are being transmitted, signals of one polarity causing decrease of illumination of such element, and signals of the opposite polarity causing an increase in illumination of such element, and causing the resulting current fluctuations in the circuit of said radio-electro-sensitive element to operate electrical signaling means.

2. The herein described method of receiving and amplifying telegraphic signals, which comprises receiving signals transmitted through an electric circuit by currents of one polarity for one class of signals of the telegraphic code, and by currents of the opposite polarity for another class of signals of the telegraphic code, causing the signals to vary the degree of illumination of a radio-electro-sensitive element in an electric circuit, which element is illuminated to an intermediate and substantial degree when no signals are being transmitted, signals of one polarity causing decrease of illumination of such element, and signals of the opposite polarity causing an increase in illumination of such element, and causing the resulting current fluctuations in the circuit of said radio-electro-sensitive element to operate electrical signaling means.

3. An apparatus for receiving and amplifying telegraphic signals embodying a radio-electro-sensitive element, an electric circuit including said element, signal reproducing means included in said circuit and adapted to be operated by variations of current flowing through the circuit, means for projecting a broad light beam into such position that it will normally be partly on and partly off the surface of said radio-electro-sensitive element to normally partially illuminate such element, means for moving the light beam to one side of its normal position for dots, and to the other side of its normal position for dashes of the telegraph code, whereby the illumination of the surface area of said radio-electro-sensitive element is varied, the current flow in said circuit varied, and the signal reproducing means operated in accordance with the particular character of the telegraph code received.

4. An apparatus for receiving and amplifying telegraphic signals embodying a selenium cell, an electric circuit including said cell, signal reproducing means, included in said circuit, and adapted to be operated by variations of current flowing through the circuit, means for projecting a broad light beam normally in such position that it will be partly on and partly off the surface of said selenium cell to normally partially illuminate such cell, means for moving the light beam to one side of its normal position for dots, and to the other side of its normal position for dashes of the telegraph code, whereby the illumination of the surface area of said selenium cell is varied, the current flow in said circuit varied, and the signal reproducing means operated in accordance with the particular character of the telegraph code received.

5. An apparatus for receiving and amplifying telegraphic signals, comprising, in combination, a radio-electro-sensitive element, a conductor mounted to oscillate, a cable circuit for controlling said conductor, said circuit being normally deënergized, means for producing a magnetic field influencing such conductor, a reflector oscillated by movement of said conductor and arranged to reflect variably a beam of radiant energy across the surface of such radio-electro-sensitive element, the rest or zero position of such reflector, when the cable circuit is normally deënergized, corresponding to a condition of partial and substantial illumination of said radio-electro-sensitive element by a beam reflected from such reflector, a controlled element controlled by the circuit of said radio-electro-sensitive element, and means for energizing and transmitting electrical impulses of opposite polarities through the cable circuit.

6. An apparatus for receiving and amplifying telegraphic signals, comprising in combination a radio-electro-sensitive element, a conductor mounted to oscillate, a cable circuit for controlling said conductor, said circuit being normally deënergized, means for producing a magnetic field influencing such conductor, a reflector oscillated by movement of said conductor and arranged to reflect variably a beam of radiant energy across the surface of such radio-electro-sensitive element, the rest or zero position of such reflector, when the cable circuit is normally deënergized, corresponding to a condition of partial and substantial illumination of said radio-electro-sensitive element by a beam reflected from such reflector, and a controlled element controlled by the circuit of said radio-electro-sensitive element, and comprising a conductor mounted to oscillate, means producing a magnetic field influencing such conductor, and means for energizing and transmitting electrical impulses of opposite polarities through the cable circuit.

7. An apparatus for receiving and amplifying telegraphic signals, comprising, in combination, a selenium cell, a cable circuit normally deënergized, a galvanometer controlled by the cable circuit and comprising a reflector arranged to be oscillated by the operation of said galvanometer and arranged to reflect variably a beam of light across the surface of such cell, the rest or zero position of such reflector, when the cable circuit is normally deënergized, corresponding to a condition of a partial and substantial illumination of said cell by a beam reflected from such reflector, and a controlled element controlled by the circuit of the said selenium cell.

8. An apparatus for receiving and amplifying telegraphic signals, comprising in combination a selenium cell, a cable circuit normally deënergized, a galvanometer controlled by the cable circuit and comprising a reflector arranged to be oscillated by the operation of said galvanometer and arranged to reflect variably a beam of light across the surface of such cell, the rest or zero position of such reflector, when the cable circuit is normally deënergized, corresponding to a condition of a partial and substantial illumination of said cell by a beam reflected from such reflector, and a second galvanometer controlled by the circuit of said selenium cell and comprising signal-translating means operated by the operation of such second galvanometer.

9. Apparatus for receiving and amplifying telegraphic signals comprising in combination a radio-electro-sensitive device, a controlled element, and a circuit connecting said controlled element and radio-electro-sensitive device and including a battery, and a branch circuit connected to said first mentioned circuit on opposite sides of said radio-electro-sensitive element and battery, and containing a battery arranged to oppose with its potential the potential of said first mentioned battery.

10. In telegraphic apparatus of the kind referred to, a receiving instrument, and two branch circuits connected thereto, one such branch circuit containing a selenium cell and generator, the other branch circuit containing a generator opposing the first mentioned generator.

11. In a telegraphic apparatus of the kind referred to, a Wheatstone bridge, a radio-electro-sensitive element in one arm of the bridge, normally balancing resistances in the other arms of the bridge, a generator connected to the ends of such bridge, a receiving instrument included in the cross wire of the bridge, and means for projecting a broad beam of light upon the radio-electro-sensitive element for normally illuminating a substantial portion of said element to normally maintain the bridge in balanced condition and the radio-electro-sensitive element at a proper working resistance.

12. In a telegraphic apparatus of the kind referred to, a Wheatstone bridge, a radio-electro-sensitive element in one arm of the bridge, normally balancing resistances in the other arms of the bridge, a generator connected to the ends of such bridge, a receiving instrument included in the cross wire of the bridge, and inductive resistance also in the cross wire and in shunt with respect to the receiving instrument.

13. In a telegraphic apparatus of the kind referred to, a Wheatstone bridge, and normally balanced resistances in the arms of said bridge, at least one of said resistances being in the form of radio-electro-sensitive means, a generator connected to the ends of such bridge, and a receiving instrument included in the cross wire of the bridge, in combination with means for projecting a broad beam of light upon the radio-electro-sensitive means to normally maintain the bridge in balanced condition and the radio-electro-sensitive means at a proper working resistance.

14. In a telegraphic apparatus of the kind referred to, a Wheatstone bridge, and normally balanced resistances in the arms of said bridge, at least one of said resistances being in the form of radio-electro-sensitive means, a generator connected to the ends of such bridge, and a receiving instrument included in the cross wire of the bridge, in combination with an actuating element, and means operated by said element for projecting a relatively broad beam of radiant energy upon the radio-electro-sensitive means for normally illuminating a substantial portion of said radio-electro-sensitive means to normally maintain the bridge in balanced condition and the radio-electro-sensitive means at a proper working resistance.

15. In a telegraphic apparatus of the kind referred to, a Wheatstone bridge, and normally balanced resistances in the arms of said bridge, at least one of said resistances being in the form of radio-electro-sensitive means, a generator connected to the ends of such bridge, a receiving instrument included in the cross wire of the bridge, and inductive resistance also in said cross wire and in shunt with respect to said receiving instrument.

16. In telegraphy, a receiving instrument, a circuit including a source of electrical energy for controlling the operation of the receiving instrument, radio-electro-sensitive means included in said circuit, means for projecting a broad beam of light upon the radio-electro-sensitive means for normally illuminating a substantial portion thereof, to normally maintain the radio-electro-sensitive means at a proper working resistance, and means associated with said circuit for normally balancing the effect of the current of said circuit on the receiving instrument.

In testimony whereof I have signed this specification in the presence of two subscribing witnesses.

THOMAS BULLITT DIXON.

Witnesses:
BJORNE W. JOHNSON,
WILLIAM S. JACKNOW.